United States Patent
Conner et al.

(10) Patent No.: US 7,778,745 B2
(45) Date of Patent: Aug. 17, 2010

(54) SYSTEMS AND METHODS FOR DETECTING AND ALERTING MIS-SETTING OF BAROMETRIC ALTIMETER SETTING DURING A TRANSITION ALTITUDE

(75) Inventors: Kevin J Conner, Kent, WA (US); Yasuo Ishihara, Kirkland, WA (US); Steve C. Johnson, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 1021 days.

(21) Appl. No.: 11/469,372

(22) Filed: Aug. 31, 2006

(65) Prior Publication Data

US 2008/0059008 A1 Mar. 6, 2008

(51) Int. Cl.
*G01S 1/00* (2006.01)
(52) U.S. Cl. ............................................ 701/9; 342/29
(58) Field of Classification Search ...................... 701/4, 701/9, 14, 301; 340/963, 970; 342/29, 65, 342/462
See application file for complete search history.

(56) References Cited

U.S. PATENT DOCUMENTS

| | | | | |
|---|---|---|---|---|
| 4,021,009 A | * | 5/1977 | Baker et al. | 244/180 |
| 5,077,673 A | * | 12/1991 | Brodegard et al. | 701/301 |
| 5,828,332 A | * | 10/1998 | Frederick | 342/26 B |
| 6,216,064 B1 | * | 4/2001 | Johnson et al. | 701/4 |
| 6,522,298 B1 | * | 2/2003 | Burgett et al. | 342/462 |
| 2004/0186635 A1 | | 9/2004 | Manford | |

* cited by examiner

Primary Examiner—Dalena Tran
(74) Attorney, Agent, or Firm—Black Lowe & Graham PLLC

(57) ABSTRACT

Systems and methods for producing an advisory if barometric altitude transition setting needs adjusting in an aircraft. In one embodiment, the method determines transition altitude, receives an uncorrected altitude, compares the uncorrected altitude to the transition altitude and to corrected altitude, and outputs a barometric altitude transition setting advisory based on the comparison between the uncorrected altitude and the transition altitude. The comparison determines if the uncorrected altitude is greater than the determined transition altitude and the advisory is output if the uncorrected altitude is determined to be greater than the transition altitude and the uncorrected altitude differs from the corrected altitude by a threshold amount. A delay is provided between the comparison of the uncorrected altitude to the transition altitude and the comparison between the uncorrected altitude and the corrected altitude.

17 Claims, 2 Drawing Sheets

SYSTEMS AND METHODS FOR DETECTING AND ALERTING MIS-SETTING OF BAROMETRIC ALTIMETER SETTING DURING A TRANSITION ALTITUDE

BACKGROUND OF THE INVENTION

Occasionally, a pilot may forget to reset the barometric pressure reference setting to standard (29.92" Hg) when transitioning through the transition altitude. This can lead to the aircraft flying at a different altitude than that assigned. Aircraft cruise within flight routes at assigned altitudes. If an aircraft is not flying at its assigned altitude, it becomes a threat to other aircraft operating in the same flight route.

Also, transition altitude varies from area to area and it can be difficult to remember the transition altitude value. Therefore, there exists a need to alert a flight crew when the barometric pressure reference setting has not been adjusted after transitioning through a transition altitude.

SUMMARY OF THE INVENTION

The present invention provides systems and methods for producing an advisory if barometric altitude transition setting needs adjusting in an aircraft. In one embodiment, the method determines transition altitude, receives an uncorrected altitude and a corrected altitude, compares the uncorrected altitude to the transition altitude and to the corrected altitude, and outputs a barometric altitude transition setting advisory based on the comparison between the uncorrected altitude and the corrected altitude.

In accordance with further aspects of the invention, the comparison determines if the uncorrected altitude is greater than the determined transition altitude and the advisory is output if the uncorrected altitude is determined to be greater than the transition altitude and the uncorrected altitude is determined to differ from the corrected altitude by a threshold amount.

In accordance with other aspects of the invention, the threshold amount is greater than 50 feet.

In accordance with yet other aspects of the invention, the location of the aircraft is determined, then the transition altitude is retrieved from a database based on the determined aircraft location.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
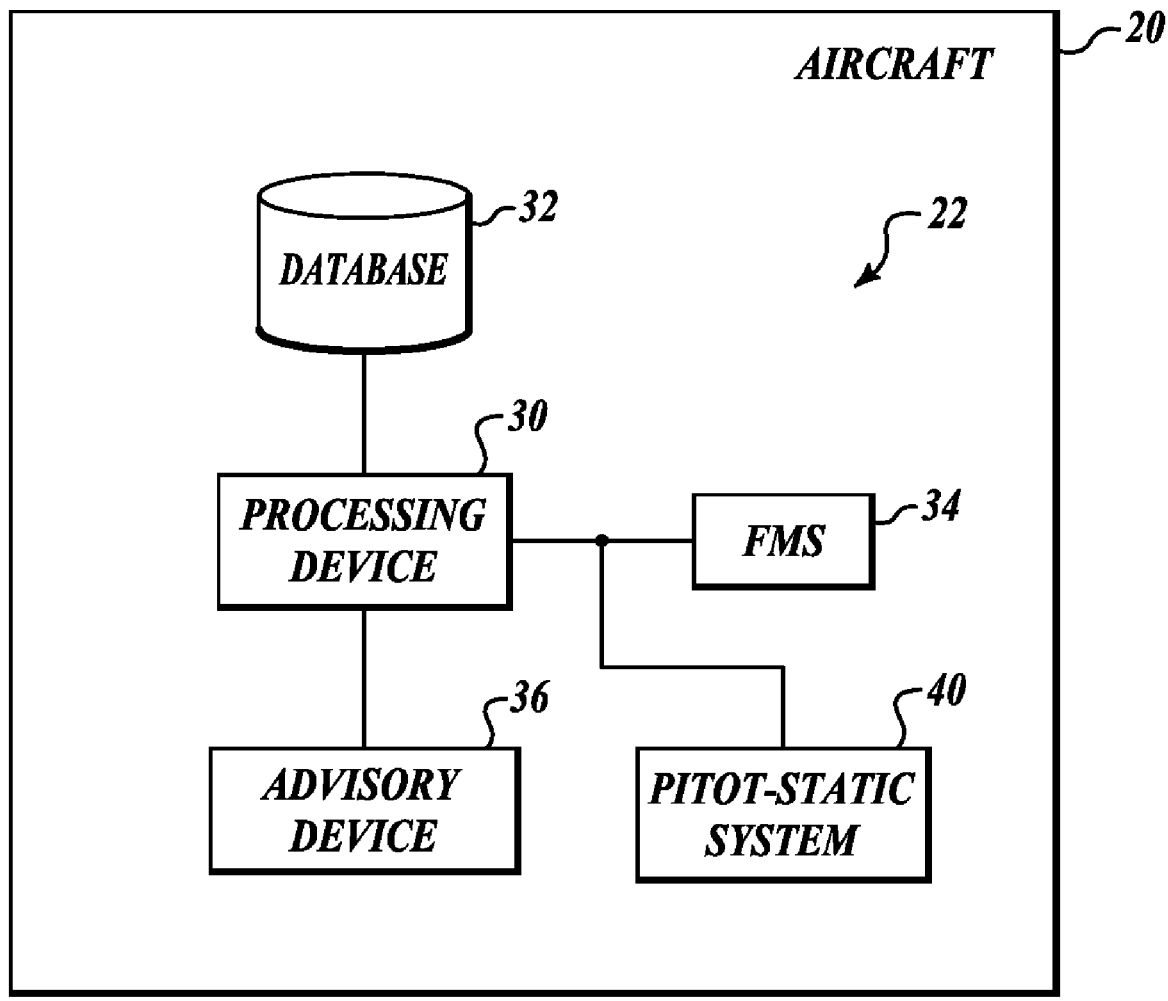
FIG. 1 illustrates a schematic block diagram of a system formed in accordance with an embodiment of the present invention.

FIG. 1 illustrates a block diagram of an aircraft 20 that includes a detection and alerting system 22 that warns flight crew when they have failed to reset the barometric pressure setting to standard pressure (29.92" Hg) after the aircraft 20 has transitioned above a predefined transition altitude.

The system 22 includes a processing device 30 that is in data communication with a database 32, a flight management system (FMS) 34, and an advisory device 36. A pitot-static system 40 is in signal communication with the FMS 34 (or an Air Data Computer (not shown) implemented with the FMS 34). The processing device 30 retrieves a transition altitude value from either one of the database 32, the FMS 34, or some other external source and compares the transition altitude to the altitude value produced by the pitot-static system 40. The altitude information retrieved from the system 40 is considered an uncorrected altitude in that it is the altitude value before it is corrected by the barometric pressure reference setting. Then, the processing device 30 determines if it is necessary to output an advisory message via the advisory device 36.

In one embodiment, the advisory device 36 includes one or more speakers. The processing device 30 outputs a voice file previously stored in the database 32 through the speakers. In another embodiment, the processing device 30 synthesizes a voice file that is outputted via the speakers. The outputted voice files provide a spoken message advising the flight crew to reset the barometric pressure reference setting.

Figure 2:
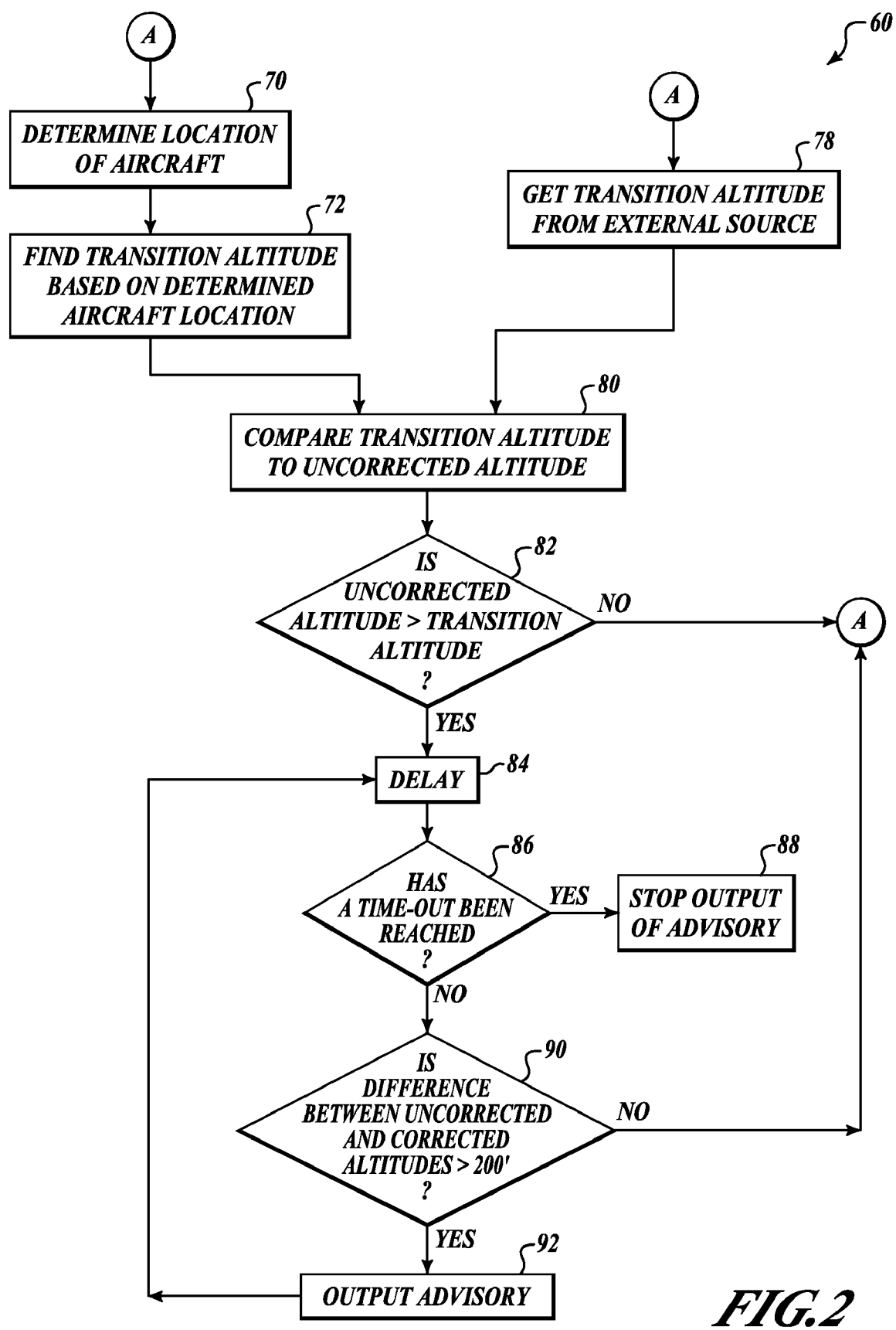
FIG. 2 illustrates a flow diagram of an example process performed by the system shown in FIG. 1.

FIG. 2 illustrates an example process 60 performed by the processing device 30 of FIG. 1. First, the processing device 30 receives the transition altitude. This can be performed a number of ways. In a first method for retrieving the transition altitude, the processing device 30 determines the location of the aircraft, see block 70. The location of the aircraft can be determined by reception of location information from the FMS 34 or some other source. In the case where the processing device 30 is implemented in an Enhanced Ground Proximity Warning System (EGPWS) (not shown), the EGPWS already has access to aircraft location information (e.g., GPS). Next, at a block 72, the processing device 30 finds transition altitude based on the determined aircraft location. Finding transition altitude can be performed a number of ways. For example, the database 32 can be pre-stored with transition altitude information relative to geographic regions. In another example, the transition altitude is stored within the database 32 relative to airports or runways and the processing device 30 determines the closest or intended runway or airport based on the determined aircraft location as well as other information. This determination of closest or intended runway or airport is described in more detail in U.S. Pat. No. 6,983,206, which is hereby incorporated by reference.

Another method for attaining transition altitude information is by retrieving it from an external source, see block 78. An external source maybe FMS 34 or may be something exterior to the aircraft such as from a ground facility or some other external source via a data feed.

At a block 80, the processing device 30 compares the transition altitude to an uncorrected altitude. Next, at a decision block 82, the processing device 30 determines if the uncorrected altitude is greater than the transition altitude. If the uncorrected altitude is not greater than the transition altitude, then the process 60 returns to the beginning in order to re-run the comparison. If it is determined that the uncorrected altitude is greater than the transition altitude, then a delay occurs at block 84 (e.g., 10-50 seconds). Next, at a decision block 86 the process 60 stops the output of an advisory (if activated), at block 88, if a time-out (e.g., between 1-15 minutes) period has been reached. Otherwise, the processing device 30 determines at a decision block 90 if the difference between the uncorrected altitude and corrected altitude is greater than a threshold amount. In one embodiment, the threshold amount is 200 feet, but could be any value depending upon aircraft operator preference. If the difference between the uncorrected and the corrected altitude is not greater than the threshold amount, the processing device 30 waits until such time as that decision at block 90 is satisfied.

If the difference between the uncorrected and the corrected altitude is greater than the threshold amount, the processing device 30 outputs an advisory through the advisory device 36, see block 92. After the advisory is output, the process 60 returns to block 84

In one embodiment, the advisory outputted via the advisory device 36 occurs three times at 8 second intervals, but other intervals and number of occurrences may be used depending upon user preferences.

While the preferred embodiment of the invention has been illustrated and described, as noted above, many changes can be made without departing from the spirit and scope of the invention. For example, the steps in the process 60 may be performed in a different order without departing from the spirit and scope of the invention (for example, delay block 88 may be performed before block 84). Also, the process 60 may be performed in any of the various processor on board an aircraft, for example, but not limited to, an EGPWS, FMS, or INS. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for producing an advisory if barometric altitude transition setting is incorrect, the method comprising:
    determining transition altitude;
    receiving an uncorrected altitude and a corrected altitude, both altitudes identify an aircraft's current position;
    comparing the uncorrected altitude to the transition altitude and to the corrected altitude; and
    outputting a barometric altitude transition setting advisory based on the comparison between the uncorrected altitude and the transition altitude and the corrected altitude.

2. The method of claim 1, wherein comparing comprises determining if the uncorrected altitude is greater than the determined transition altitude, and wherein outputting comprises outputting the advisory if the uncorrected altitude is determined to be greater than the transition altitude and the uncorrected altitude differs from the corrected altitude by a threshold amount.

3. The method of claim 2, wherein the threshold amount is greater than 50 feet.

4. The method of claim 2, further comprising delaying after the uncorrected altitude was determined to be greater than the transition altitude.

5. The method of claim 4, wherein the delay is in a range of 10 to 60 seconds.

6. The method of claim 1, wherein the outputted advisory is a sound file that is outputted 2 to 8 times having time intervals between 5 and 30 seconds.

7. The method of claim 1, wherein determining transition altitude comprises:
    determining location of the aircraft; and
    retrieving transition altitude from a database based on the determined aircraft location.

8. The method of claim 1, wherein determining transition altitude comprises:
    determining an intended runway; and
    retrieving transition altitude from a database based on the determined intended runway.

9. A system for producing an advisory if barometric altitude transition setting is incorrect, the system comprising:
    an output device;
    a barometric altitude system; and
    a processing device in communication with the output device and the barometric altitude system, the processing device comprising:
        a first component for determining transition altitude;
        a second component for receiving an uncorrected altitude and a corrected altitude, both altitudes identify an aircraft's current position;
        a third component for comparing the uncorrected altitude to the transition altitude and to the corrected altitude; and
        a fourth component for outputting a barometric altitude transition setting advisory signal to the output device based on the comparison between the uncorrected altitude, the transition altitude, and the corrected altitude.

10. The system of claim 9, wherein the third component comprises a component for determining if the uncorrected altitude is greater than the determined transition altitude, and the fourth component comprises a component for outputting the advisory signal if the uncorrected altitude is determined to be greater than the transition altitude and the uncorrected altitude differs from the corrected altitude by a threshold amount.

11. The system of claim 10, wherein the threshold amount is greater than 50 feet.

12. The system of claim 10, wherein the third component compares the uncorrected altitude to the corrected altitude after a delay from comparing the uncorrected altitude to the transition altitude.

13. The system of claim 12, wherein the delay is in a range of 10 to 60 seconds.

14. The system of claim 9, wherein the outputted advisory is a sound file that is outputted 2 to 8 times having time intervals between 5 and 30 seconds.

15. The system of claim 14, further comprising a database in communication with the processing device for storing at least one of one or more transition altitudes stored according to geographic location or the sound file.

16. The system of claim 15, wherein the first component determines location of the aircraft and retrieves the transition altitude from the database based on the determined aircraft location.

17. The system of claim 9, wherein the first component determines an intended runway and retrieves transition altitude from a database based on the determined intended runway.

* * * * *